(12) United States Patent
Laxminarayana et al.

(10) Patent No.: US 10,769,359 B1
(45) Date of Patent: Sep. 8, 2020

(54) DYNAMIC DETERMINATION OF MISSING FIELDS

(71) Applicant: INTUIT INC., Mountain View, CA (US)

(72) Inventors: Pradeep Kurunimakki Laxminarayana, Bangalore (IN); John Samuel, Bangalore (IN); Arun Satyarth, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 16/212,253

(22) Filed: Dec. 6, 2018

(51) Int. Cl.
*G06F 40/174* (2020.01)
*G06N 3/08* (2006.01)

(52) U.S. Cl.
CPC ............ *G06F 40/174* (2020.01); *G06N 3/08* (2013.01)

(58) Field of Classification Search
CPC ...... G06F 16/954; G06F 3/0482; G06F 40/14; G06F 3/0484; G06F 9/451; G06F 3/1454
See application file for complete search history.

(56) References Cited

U.S. PATENT DOCUMENTS

| | | | |
|---|---|---|---|
| 2016/0134654 A1* | 5/2016 | Ghent | G06F 16/9024 726/25 |
| 2017/0011379 A1* | 1/2017 | Kouru | G06Q 20/3223 |
| 2017/0185612 A1* | 6/2017 | Kamadolli | H04L 63/20 |
| 2018/0011678 A1* | 1/2018 | Shipper | G06F 3/0482 |
| 2018/0181866 A1* | 6/2018 | Dalle | G06N 20/00 |
| 2019/0108443 A1* | 4/2019 | Dwarakanath | G06F 11/36 |

* cited by examiner

*Primary Examiner* — Cao H Nguyen
(74) *Attorney, Agent, or Firm* — DLA Piper LLP (US)

(57) ABSTRACT

A processor may receive a data submission made through the UI. The data submission may lack data in at least one blank field provided in the UI for entering information in which no information has been entered. The processor may classify the data submission as having at least one data submission type using at least one machine learning (ML) process. The processor may determine at least one required field for the at least one data submission type. The at least one required field may require information to be entered therein. The processor may determine that the at least one blank field is also the at least one required field. The processor may cause the UI to indicate that the at least one blank field is also the at least one required field.

20 Claims, 8 Drawing Sheets

Decedent Information

| Field | Value |
|---|---|
| First Name & Initial | 5325 |
| Last Name | 1231 |
| Title / Suffix | 21432 |
| Social Security # | 253-54-3543 |
| Estate's Federal ID# | 35-43 |
| Date of Birth | |
| Date of Death | |
| Domicile of Death | |
| Year Domicile Estab | |
| Citizenship at Death | |
| Died Testate? ☑ | |
| Primary Contact | |

Miscellaneous Info

| Field | Value |
|---|---|
| Custom Filter | |
| Firm Number | 48703811 - TY17 EOC platinum - Plano, TX ▸ |
| Preparer | ▸ |
| Staff Preparer | ▸ |
| Prepared by | Firm ▸ |

Decedent Information

| Field | Value |
|---|---|
| First Name & Initial | 5325 |
| Last Name | 1231 |
| Title / Suffix | 21432 |
| Social Security # | 253-54-3543 |
| Estate's Federal ID# | |
| Date of Birth | 35-43 |
| Date of Death | |
| Domicile at Death | |
| Year Domicile Estab. | |
| Citizenship at Death | |
| Died Testate? ☑ | |
| Primary Contact | |

302A (First Name & Initial, Last Name, Title/Suffix, Social Security #)
306A (Date of Birth field, Date of Death field)
304A (Date of Death, Domicile at Death)
302C (Died Testate?)

PREDICTING REQUIRED DATA

Miscellaneous Info

| Field | Value |
|---|---|
| Custom Filter | |
| Firm Number | 48703811 - TY17 EOC platinum - Plano, TX ▶ |
| Preparer | ▶ |
| Staff Preparer | ▶ |
| Prepared by | Firm ▶ |

304A (Custom Filter)
302B (Firm Number dropdown)
304B (Preparer, Staff Preparer dropdowns)
302B (Prepared by dropdown)

| Instance where marked as required data | Type of Input Field | Type of Return | Firm Type | Form Type | State |
|---|---|---|---|---|---|
| 1 | Address | INDIVIDUAL | SMALL | 1040 | NY |
| 3 | Personal Info | PARTNERSHIP | MEDIUM | W2 | TX |
| 7 | Wages | CORP | LARGE | | CA |
| | Region | S-CORP | | | |

650

| Field Name | Field Type | Firm Type | Return Type | Form | Count |
|---|---|---|---|---|---|
| ZIP | REGION | SMALL | INDIVIDUAL | W2 | 3 |
| NAME | PERSONAL INFO | MEDIUM | CORP | 1040 | 7 |
| SSN | PERSONAL INFO | LARGE | INDIVIDUAL | W2 | 2 |

FIG. 6

DYNAMIC DETERMINATION OF MISSING FIELDS

DETAILED DESCRIPTION OF SEVERAL EMBODIMENTS

Many software applications may include user interface (UI) elements whereby a user may type, drag, paste, or otherwise enter information into one or more fields. These UIs may include elements whereby the user may save, submit, or otherwise trigger processing of the information in the fields by one or more software routines or backend systems. In some cases, the application may require data to be entered into one or more of the available fields in order to perform subsequent processing of the entered data. For example, a user may enter data into some, but not all, available fields in a UI and click a "submit" button in the UI. If one or more of the empty fields is a field for which data is required, the application may refuse submission of the data and present the UI to the user again. The application may add an indication to the UI highlighting the fields that are required and/or providing an explanation of what information is required.

In some cases, identifying required fields may be straightforward. For example, one or more specific fields may be configured to always require information entry in order to proceed. Accordingly, any time a user wishes to proceed without entering information, the application may respond by indicating that the required information must be provided. However, in other cases, one or more fields may only be required some of the time. For example, an application may be configured to perform more than one type of backend processing, and the fields that are required or not required may depend on which type of processing is being performed. In another example, a user may be presented with multiple sequential UI interfaces and, depending on what data is entered in a preceding interface, which fields are filled in a preceding interface, and/or the results of processing based on what is entered, the required data for following interfaces may change. Some applications may be affected by combinations of the above issues. Applications where field requirements may vary may benefit from dynamically determining fields with missing data.

As a non-limiting example, consider a tax preparation software product (e.g., Lacerte™ or TurboTax™). Tax preparation may be a document intensive process that may involve the gathering of disparate documents, collection of relevant data from those documents, and calculations based on the data in consultation with tax tables and related official documents. A user, such as an accountant or other tax preparer, may use a tax preparation software application to record tax related information from a client record into an electronic data file for use in preparing the client's tax return. The tax related information may be entered into various displayed fields on forms or the like.

In the field of professional tax preparation, it is rarely the case that an individual taxpayer will initially provide a complete client record containing all the necessary information to her tax preparer. Accordingly, even if the tax preparer enters all information provided by the client into the appropriate fields of a tax software UI, some required information may still be missing. However, the specific information that is missing may vary significantly from one taxpayer to the next. This may be true not only because of the varying quality of the initial information provided by taxpayers, but also because of each taxpayer's unique tax situation. For example, required data, and thus required fields, may vary based on whether the taxpayer is filing as an individual or jointly, whether the taxpayer has dependents or not, the country, state, and/or municipality of the taxpayer and/or the taxpayer's employer, the taxpayer's assets and liabilities, etc.

Embodiments described herein may be configured to dynamically assess fields and determine which fields are missing and require filled-in data. Accordingly, disclosed embodiments may be able to create and present UIs that may be individually tailored to a specific use case within an application that may otherwise be configured to handle a wide variety of use cases for a wide variety of data sets. For example, as described in detail below, some embodiments may use one or more machine learning (ML) techniques to assess records of user interactions with the application to learn patterns indicating what information is required in various scenarios. Some embodiments may be able to analyze a specific user session with the application to determine what pattern best fits with the user session and determine accordingly which information may be required or not required. The embodiments may then be able to customize required field notifications within the application's UI to specifically apply to the session.

Figure 1:
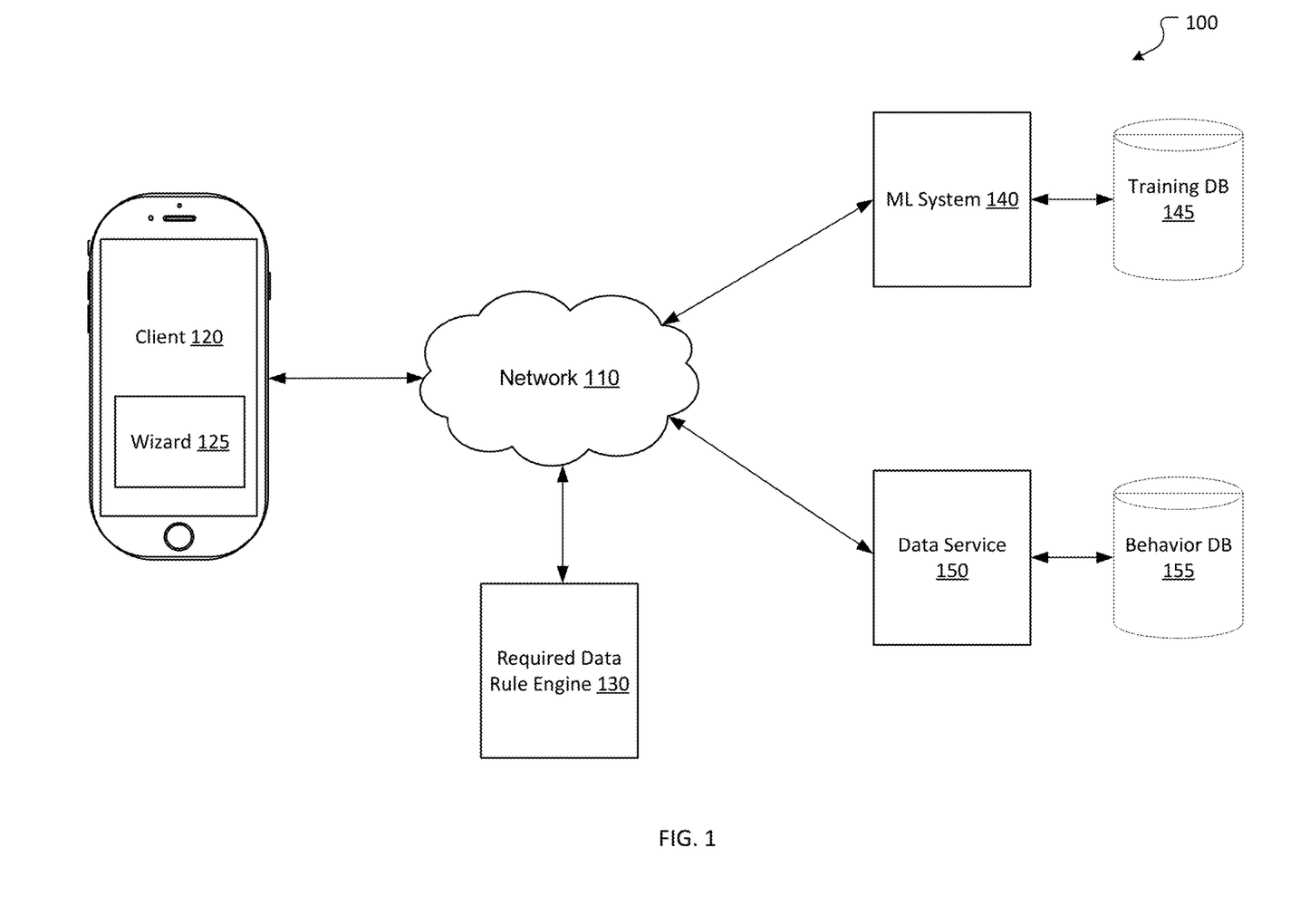
FIG. 1 shows a dynamic required field determination system according to an embodiment of the present disclosure.
Figure 2:
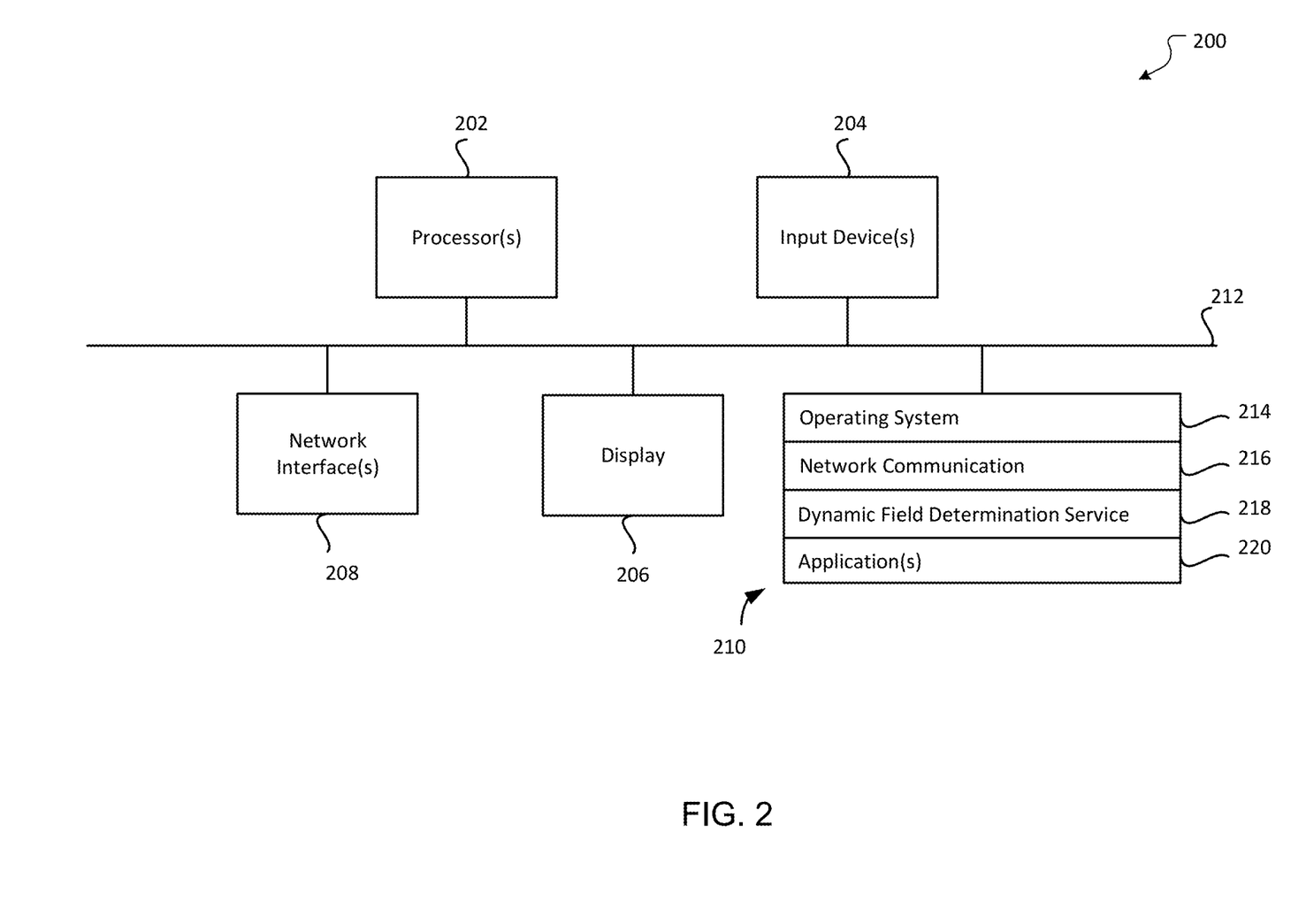
FIG. 2 shows a computing device according to an embodiment of the present disclosure.

FIG. 1 shows a dynamic required field determination system 100 according to an embodiment of the present disclosure. System 100 may include a plurality of functional elements that may be provided by one or more computing devices (e.g., one or more computing devices 200 as shown in FIG. 2). These elements may work together to dynamically determine required fields.

For example, system 100 may include at least one client 120. Client 120 may be any device configured to present UIs and receive inputs thereto. For example, client 120 may be a smartphone, personal computer, tablet, laptop computer, or other device. Client 120 may include missing data wizard 125, which may be a hardware, software, and/or firmware component of client 120. Missing data wizard 125 may present a UI including one or more fields where a user may enter data, may receive data entered into the one or more fields, and may send the data to other system 100 elements. Client 120 may receive results of processing performed by the other system 100 elements as described below. In response, missing data wizard 125 may display indications of one or more dynamically determined required fields through the UI, may receive data entered into the one or more required fields, and may send the data to other system 100 elements.

System 100 may include missing data rule engine 130, ML system 140, and/or data service 150. As described in greater detail below, missing data rule engine 130 may receive data entered into one or more fields by a user from client 120, configure one or more local rules and/or preferences that may apply to the user and/or client 120, and pass the data to ML system 140. ML system 140 may analyze the data to identify one or more required fields based on the one or more local rules and/or preferences. Data service 150 may build records of user-entered data in behavior database 155. In some embodiments, ML system 140 may use the user-entered data in behavior database 155 and/or data from training database 145 to perform one or more machine learning processes to identify the required fields.

In some embodiments, one or more of client 120, missing data rule engine 130, ML system 140, and data service 150 may communicate with one another through network 100. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet and/or other public or private networks or combinations thereof.

A single client 120 and separate, single missing data rule engine 130, ML system 140, and data service 150 are shown for ease of illustration, but those of ordinary skill in the art will appreciate that these elements may be embodied in different forms for different implementations. For example, system 100 may include a plurality of clients 120, many of which may access different data. Moreover, single missing data rule engine 130, ML system 140, and/or data service 150 may each be components of a single computing device (e.g., computing device 200 described below), or a combination of computing devices may provide single missing data rule engine 130, ML system 140, and/or data service 150. In some embodiments, the operations performed by client 120 and separate, single missing data rule engine 130, ML system 140, and data service 150 may be performed on a single device (e.g., without the various components communicating using network 110 and, instead, all being embodied in a single computing device).

FIG. 2 shows a computing device according to an embodiment of the present disclosure. For example, computing device 200 may function as client 120; one or more servers or other devices configured to provide missing data rule engine 130, ML system 140, and/or data service 150; or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable mediums 210. Each of these components may be coupled by bus 212, and in some embodiments, these components may be distributed among multiple physical locations and coupled by a network.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Dynamic field determination service instructions 218 may include instructions that providing missing data rule engine 130, ML system 140, and/or data service 150 as described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks.

The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3A:
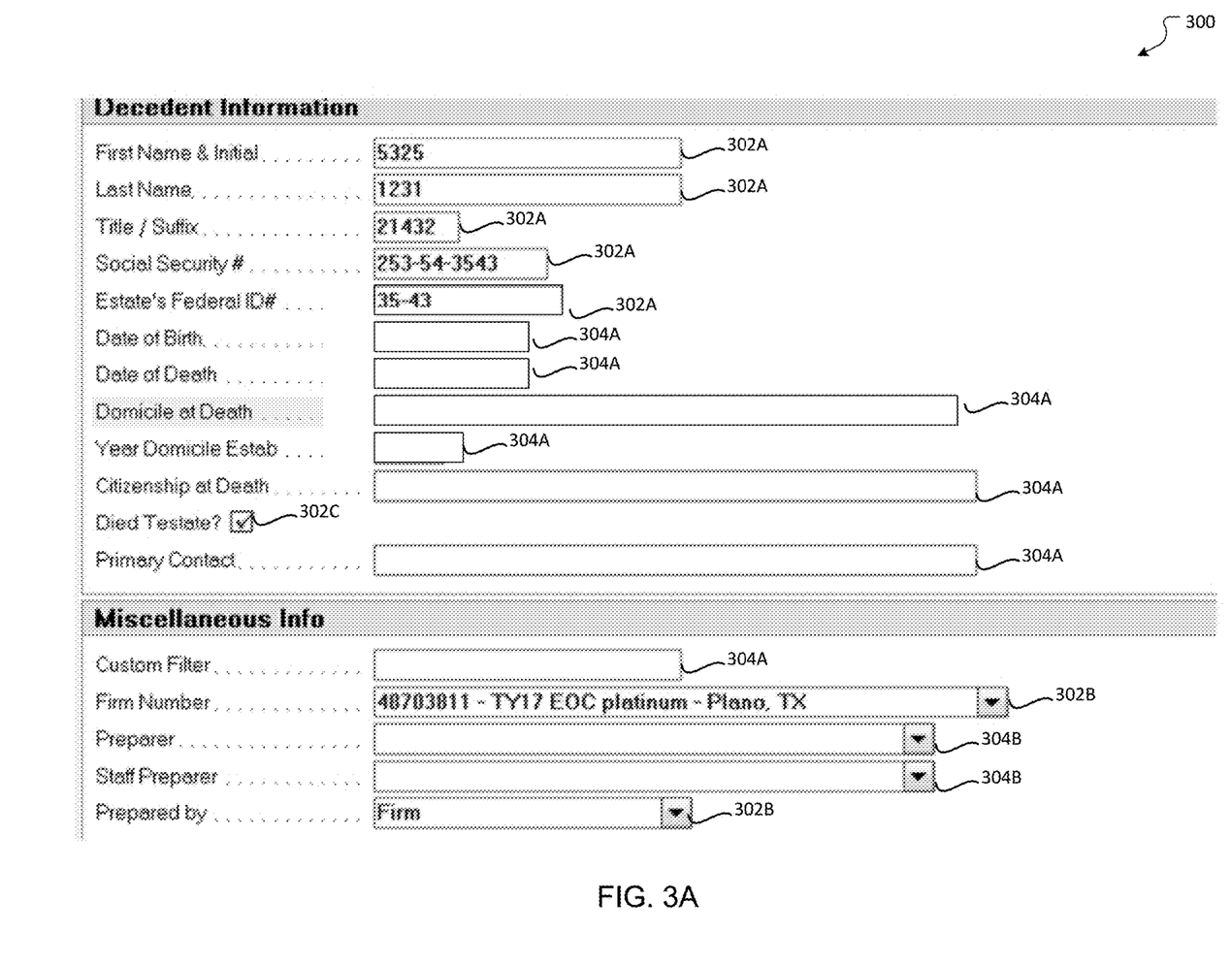
FIGS. 3A-3B show a required field interface according to an embodiment of the present disclosure.
Figure 3B:
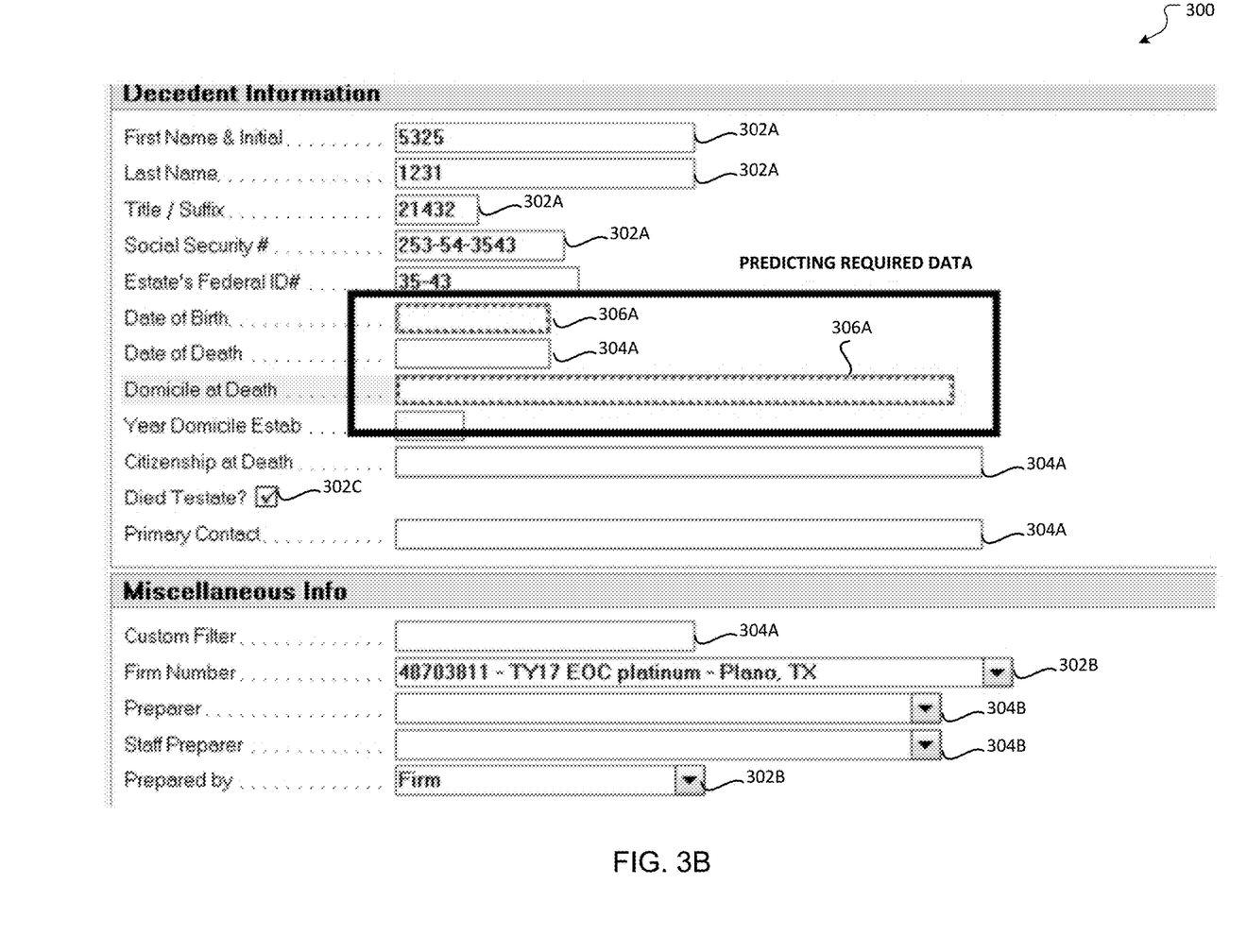

FIGS. 3A-3B show a required field UI 300 according to an embodiment of the present disclosure. In some embodiments, missing data wizard 125 may present required field UI 300 on a display of client 120. Required field UI 300 may be configured to display one or more fields 302-306. For example, required field UI 300 may display a form including one or more fields into which data may be entered. A user may be able to use an input device of client 120 (e.g., a keyboard, mouse, track pad, touchscreen, etc.) to enter data into the fields 302-306. The user may submit the data as a data submission, for example by clicking a "submit" or "next" or "save" button within required field UI 300 or the like. Fields 302-306 may include text fields 302A, 304A, 306A into which a user may enter free text and/or numbers. Fields 302-306 may include drop down fields 302B, 304B which may provide predefined options for the user to choose. Fields 302-306 may include selectable fields 302C, which may include checkboxes as shown or other selectable objects (e.g., radio elements, sliders, etc.). Several specific fields 302-306 requesting specific information are shown in FIGS. 3A-3B as examples, but required field UI 300 may present any number of fields 302-306, requesting any type of information, in any arrangement.

As shown in the example of FIGS. 3A-3B, a user may enter data into and/or select data for some fields ("filled fields 302"). A user may leave other fields blank ("blank fields 304/306"). After the user submits the data submission, processing may be performed to determine whether any of the blank fields are required fields which must be filled in. FIG. 3A shows a state of required field UI 300 prior to processing to identify required fields. Client 120 may send data to missing data rule engine 130 describing the state of required field UI 300. The data describing the state may include data filled into filled fields 302 and/or an indication of which specific fields are filled fields 302 and/or which specific fields are blank fields 304/306. As described below, missing data rule engine 130 and/or other system 100 elements may analyze the data to determine which, if any, of the blank fields 304/306 require data from the user and are therefore "required fields 306." Thus, any field with data filled therein may be a filled field 302. Any field without any data filled therein may be a blank field 304/306. Some blank fields may be determined to be required fields 306 by missing data rule engine 130 and/or other system 100 elements as described herein. In some embodiments, required fields 306 may also be identified by users, as described below. However, some blank fields 304 may not be required field 306, may not be marked as such, and may be left blank without an adverse effect on processing driven by field inputs.

Missing data rule engine 130 may send data to client 120 identifying required fields 306. As shown in FIG. 3B, required field UI 300 may mark required fields 306. In the example of FIG. 3B, required fields 306 are marked by being surrounded by a hashed border that is thicker than the borders of filled fields 302 and other blank fields 304 for which data entry is not required. This indication style is presented as an example only, and in other embodiments, required field UI 300 may use other cues to highlight required fields 306 or otherwise distinguish required fields 306 from other blank fields 304 for which data entry is not required.

Figure 4:
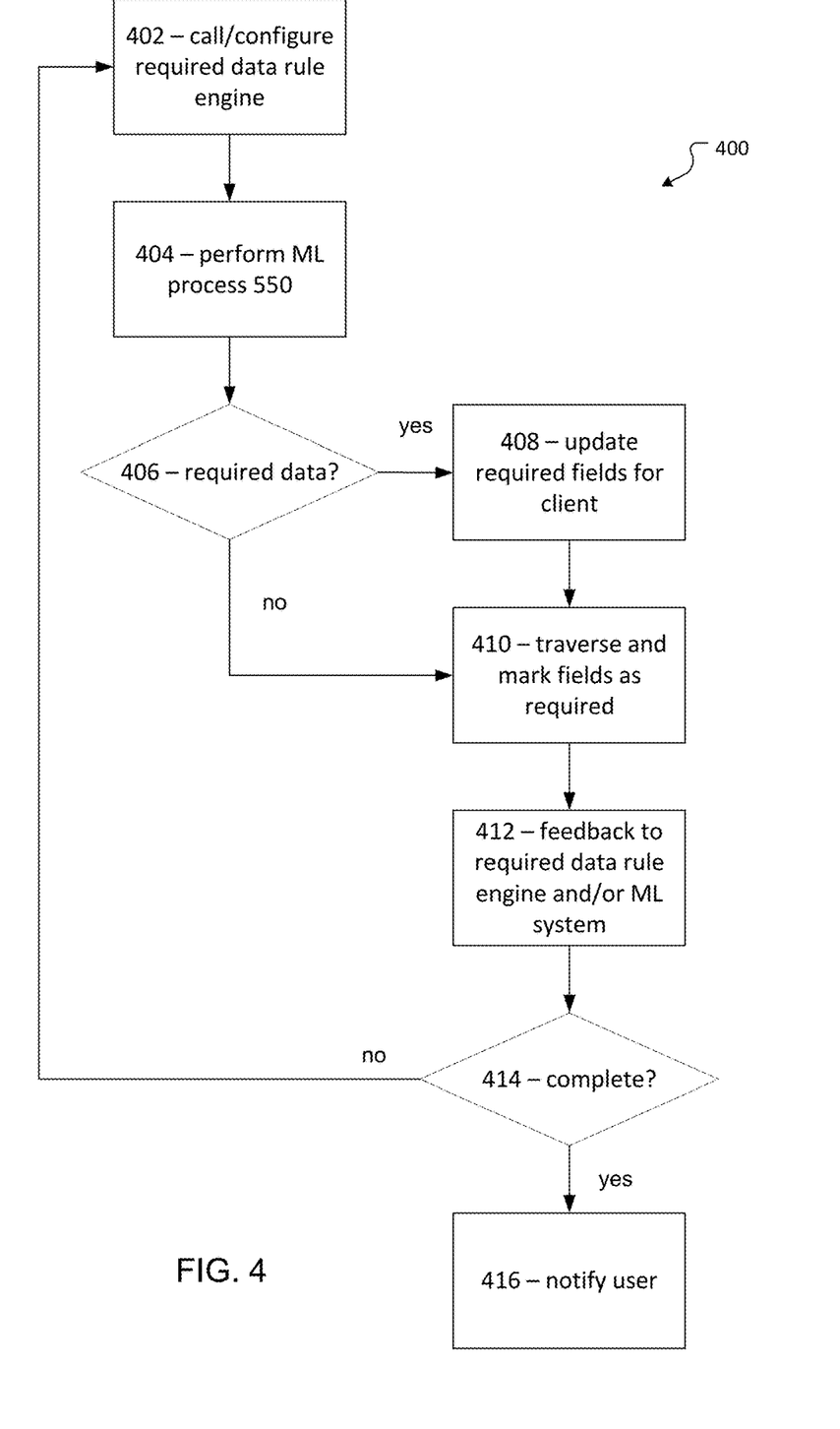
FIG. 4 shows a dynamic required field determination process according to an embodiment of the present disclosure.

FIG. 4 shows a dynamic required field determination process 400 according to an embodiment of the present disclosure. One or more portions of system 100, such as missing data rule engine 130 and ML system 140, may perform process 400 to dynamically determine whether required fields 306 are present in a required field UI 300 and to identify any required fields 306 that may be found. By performing process 400, system 100 may automatically find required fields 306 based on individual characteristics of client 120 and/or data already received by client 120. Accordingly, system 100 may automatically generate a determination of required fields 306 within required field UI 300 that may dynamically adapt to any client 120 context.

As described above, client 120 may present required field UI 300 and collect data entered into blank fields 304 (thereby causing blank fields 304 to become filled fields 302). Process 400 may begin in response to client 120 reporting the status of filled fields 302 and blank fields 304 to missing data rule engine 130. For example, a user may select a save option or submit option or advance to next screen option or the like, which may trigger client 120 to send data to missing data rule engine 130 indicating which fields are filled and which fields are blank. The data may include a list of all fields that have been presented through required field UI 300 and a status of each field (e.g., filled field 203 or blank field 304).

At 402, missing data rule engine 130 may call ML system 140 to analyze the data from client 120 to determine whether one or more required fields 306 are present among the blank fields 304. Missing data rule engine 130 may send the data from client 120 to ML system 140. Missing data rule engine 130 may also define one or more local rules and/or preferences for the specific client 120 context under which the data was captured. For example, local rules and/or preferences may allow customization of what data is regarded as required missing data. An administrative user may be able to specify local rules for missing data rule engine 130 that define fields that are necessary for all documents handled by the administrative user and/or organization (e.g., for the client 120 context of working on a document handled by the administrative user and/or organization). The administrative user may be able to specify local preferences for missing data rule engine 130 that define fields that are necessary for a specific client 120 or document (e.g., for the client 120 context of being a specific client 120 and/or working on a specific document). For example, in the tax preparation embodiment, there may be a blank field 304 for email address. Email address may not be required for tax preparation, but it may be specified as required under a local rule and/or preference because the accountant or organization overseeing the tax preparation may wish to have the email address of every end user. Missing data rule engine 130 may send the one or more local rules and/or preferences to ML system 140.

At 404, ML system 140 may perform a required field ML process 550. An example ML process 550 is described below with respect to FIG. 5B. Through ML process 550, ML system 140 may determine whether one or more blank fields 304 should be marked as required fields 306.

At 406, ML system 140 may determine whether the results from 404 indicate that one or more required fields 306 are present. If one or more required fields 306 are present, at 408, ML system 140 may update the status of the fields submitted by client 120 to reflect the presence of the required fields 306. For example, ML system 140 may modify the status of blank fields 304 that are missing in the list of all fields that have been presented through required field UI 300 to have required field 306 status.

In some embodiments, system 100 may present the results of processing at 408 (e.g., an indication of the fields marked as required fields 306) to a user for verification and/or further editing. System 100 may do so regardless of whether any fields were marked at 408 or not in some embodiments. For example, at 410, ML system 140 may send data indicating whether any blank fields 304 were marked as required fields 306 and, if so, data indicating the required fields 306 to client 120. Client 120 may present required field UI 300, for example as shown in FIG. 3, with required fields 306 indicated by one or more cues. At this stage, the user may be able to traverse blank fields 304 and required fields 306 and, if desired, indicate through required field UI 300 that one or more blank fields 304 should be marked as missing and/or indicate that one or more required fields 306 should not be marked as missing. If the user agrees with the required fields 306 or lack thereof as automatically determined by ML system 140, the user may confirm the decisions of ML system 140. Client 120 may record the user's input and return data describing the input to ML system 140.

For example, the sample required field UI 300 of FIG. 3 is directed to gathering information about a decedent. In the sample, ML system 140 may have determined that the "date of death" blank field 304 was not a required field 306, but the "domicile at death" field was a required field 306. If a user, who may be a skilled knowledge worker with experience entering decedent information into forms of this type, disagrees with either determination, she may change "date of death" to a required field 306 and/or change "domicile at death" to a blank field 304.

At 412, missing data rule engine 130 and/or ML system 140 may apply any user feedback received at 410. For example, changes made by users may be input to the ML algorithm as training data. As described below, ML system 140 may apply one or more ML algorithms to identify required fields 306. By inputting and processing the user feedback as training data, ML system 140 may learn which fields are required fields 306 and which are not.

At 414, missing data rule engine 130 may determine whether there is any further data to evaluate for the presence of one or more required fields 306. For example, as noted above, missing data rule engine 130 may call ML system 140 to analyze data in response to the data being received and/or submitted through client 120. In some cases, multiple sets of data may be received, such as when required field UI 300 presents multiple screens each having a different set of fields, or when data is entered through required field UI 300 for multiple different users and/or scenarios, or the like. Accordingly, missing data rule engine 130 may check to determine whether all available data sets from client 120 have been evaluated for missing data. If there is more data to be evaluated, process 400 may return to 402.

If there is no more data to be evaluated, at 416, system 100 may notify a user who may have the missing information to fill in the identified required fields 306 if applicable. For example, ML system 140 may send data indicating whether any blank fields 304 were marked as missing and, if so, data indicating the required fields 306 to client 120. Client 120 may present required field UI 300, for example as shown in FIG. 3, with required fields 306 indicated by one or more cues. Thus, the user of client 120 may know what fields are missing and may provide the missing data therein. In another example, client 120 may be operated by an intermediary user, such as a tax preparer for a client user's tax return. In such cases, ML system 140 may send a message to the client user (e.g., a text, an email, a push notification, or any other type of message). The message may indicate the missing data and/or may provide instructions on how to provide the missing data to the intermediary user of client 120.

Figure 5A:
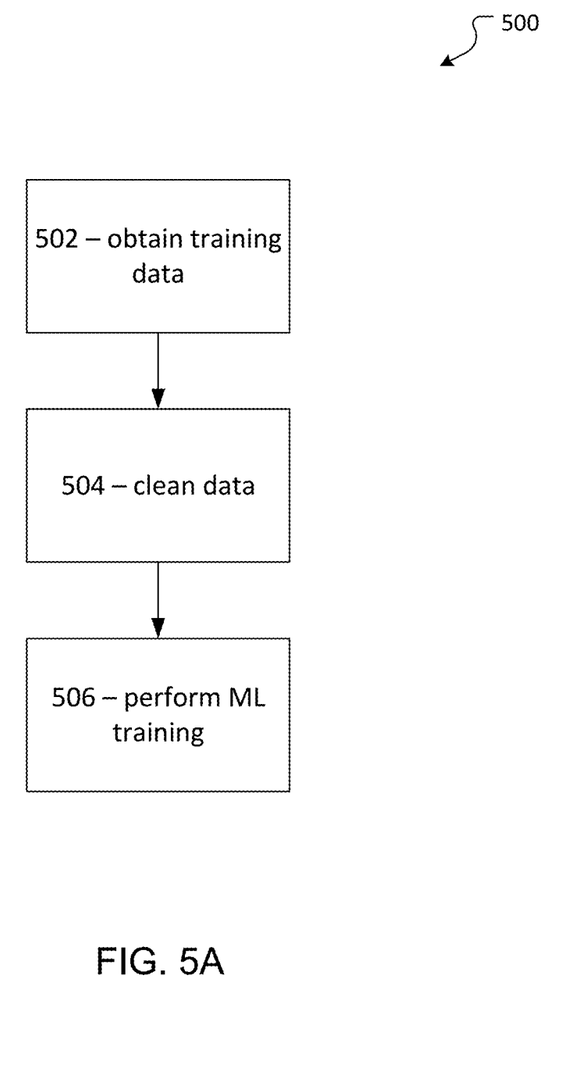
FIGS. 5A-5B shows required field learning processes according to an embodiment of the present disclosure.
Figure 5B:
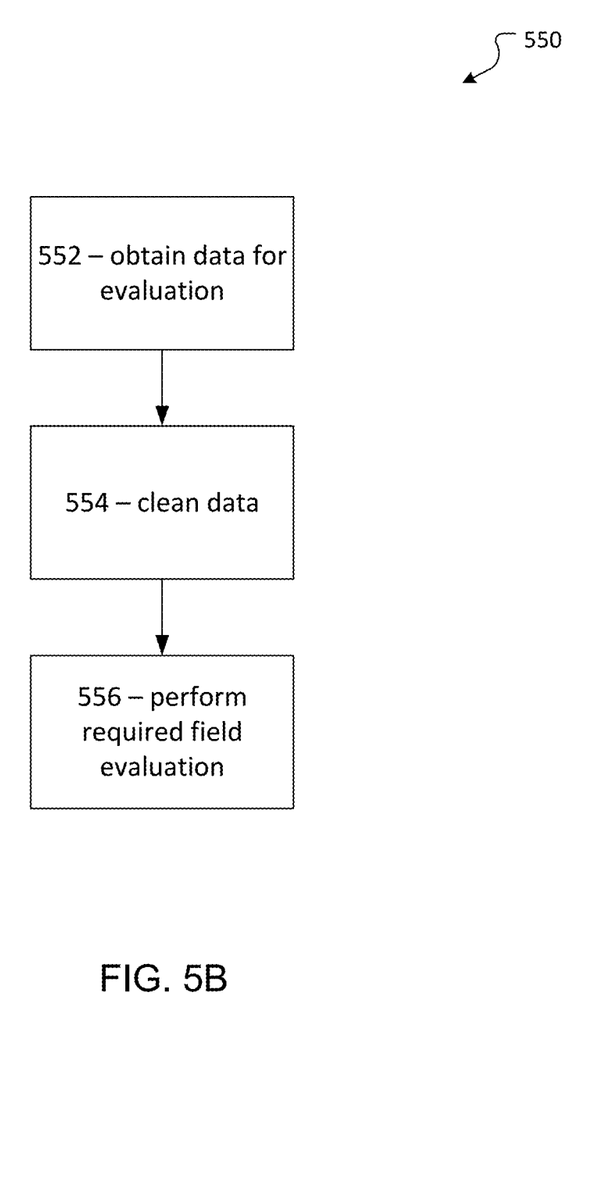

FIGS. 5A-5B shows required field ML processes 500 and 550 according to an embodiment of the present disclosure. One or more portions of system 100, such as ML system 140, may perform process 500 to generate training data that may be useful for identifying required fields 306 and/or may perform process 550 as part of a dynamic required field determination process 400 as described above. In the former case, ML system 140 may use data from behavior database 155 to create training data. In the latter case, ML system 140 may use the training data it created to evaluate a specific submission from required field UI 300, such as a single instance of a user filling out (or partially filling out) a set of blank fields 304, as part of process 400.

Turning first to process 500 of FIG. 5A, ML system 140 may develop training data sets for one or more local preference and/or rule combinations based on observed behavior data. ML system 140 may use one or more ML algorithms to do so. ML algorithms may include algorithms that classify data through automatic observation of patterns in the data and/or cluster data that may be similarly classified. For example, in process 500, ML system 140 may use ML to generate training data that may be indicative of observed patterns of fields that may always (or most of the time) be filled in for a given type of document. Then, when new documents with one or more blank fields 304 are received, they may be evaluated against the training data for documents of a similar type to locate required fields 306 based on the training data.

At 502, ML system 140 may obtain data for training. For example, data service 150 may collect data submitted through past instances of required field UI 300 (e.g., previous examples where required fields 306 were identified in required field UI 300) and/or through similar UIs (e.g., configured to capture similar data) that are not subjected to automatic dynamic required field determination processing. Returning to the example of FIG. 3, assume a similar UI that is not subjected to automatic dynamic required field determination processing has been in use for some length of time. Every time a client 120 submitted decedent information through the UI, data service 150 may have recorded which fields were filled in and which were not filled in and may have stored this data in behavior database 155 and may have stored the values of the filled-in data as well. ML system 140 may obtain the stored data from behavior database 155. As described below, this data may be provided as input to one or more ML algorithms.

Figure 6:
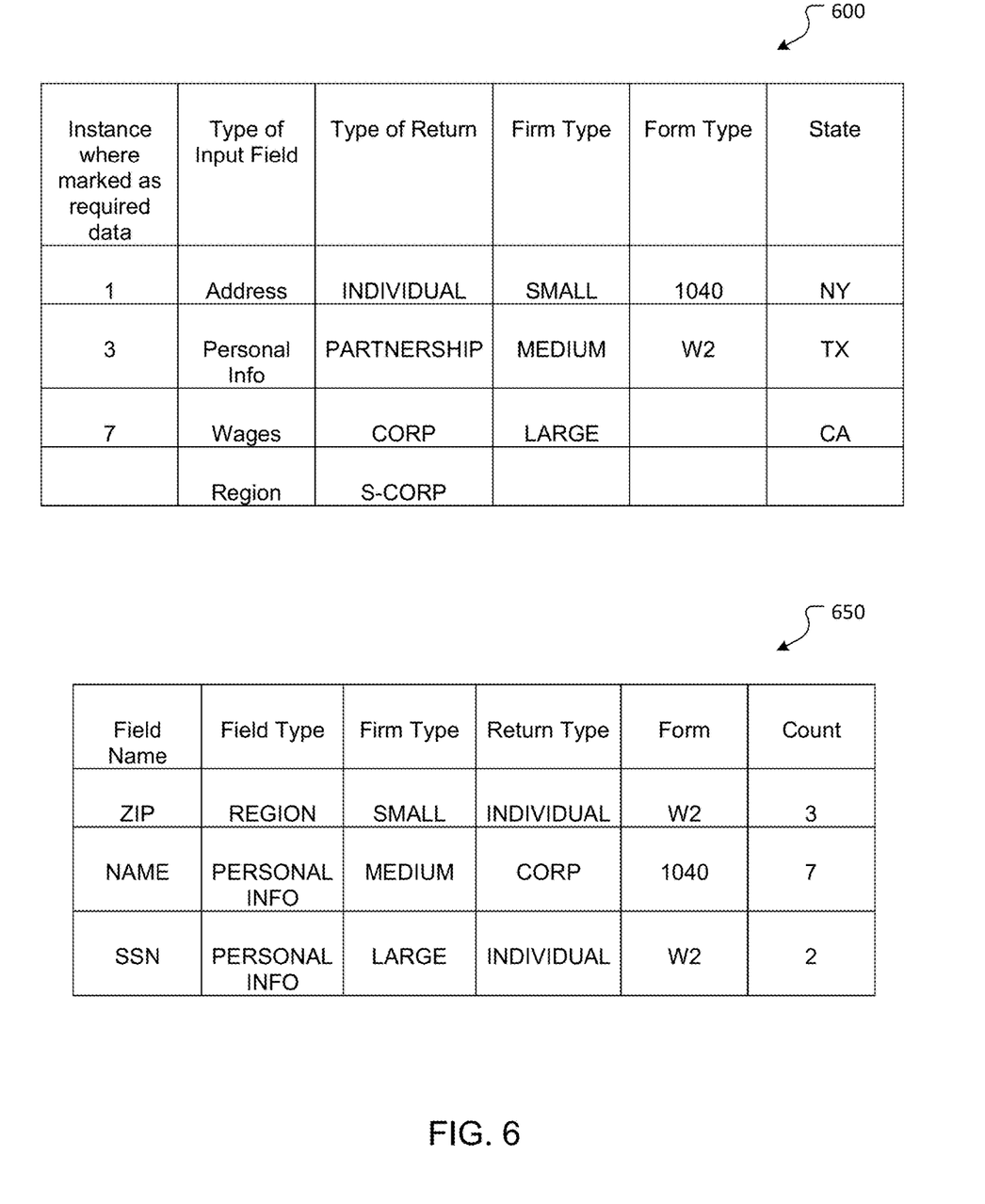
FIG. 6 shows field data examples according to an embodiment of the present disclosure.

At 504, ML system 140 may clean the data obtained at 502. For example, ML system 140 may clean the data to remove extraneous information that may not be useful for the ML training and/or to place all the data collected by data service 150 into a standard format. FIG. 6 shows field data examples 600 and 650 according to an embodiment of the present disclosure, where data set 600 represents an example of raw data obtained at 502, and clean data set 650 represents data after cleaning at 504.

Cleaning may identify and group recurring patterns in the data. For example, referring to FIG. 6, unclean data 600 may include data about one or more fields available in the training data. The example unclean data 600 includes field type, return (form) type, firm type (e.g., which may relate to a local rule applying to that firm type), form type (e.g., which may relate to a local preference applying to that form type), state (e.g., which may relate to a local rule applying to that state), and a number of times the field was marked as required. Unclean data 600 may include user feedback and/or other superfluous data that may not be useful for classifying the data. For example, consider a scenario where users (e.g., trained accountants evaluating a tax form with fields) manually mark one or more fields as required. In this example scenario, assume three accountants mark 'ZIP' as required for INDIVIDUAL forms. These user-marked examples may be submitted as training data. There may be three such entries along with other fields such as time of marking, state name, firm type, etc. While cleaning, ML system 140 may group all entries of ZIP and combine them with a count value of 3. ML system 140 may discard other attributes which may be common and/or otherwise irrelevant to the ML learning.

After cleaning, the training data may be in the form of cleaned data 650. Cleaned data 650 may apply a uniform format to the training data, for example specifying field name, field type, firm type, return type, form, and count where marked as required. For instance, the "address" information from unclean data 600 may be cleaned from cleaned data 650, which may include only a "zip" field related to the broader address data and may omit more granular address data such as street address. In this way, superfluous data that may not be used for classifying (e.g., street address, which may be unique to every form and thus not helpful) while preserving useful data for classifying (e.g., zip code, which may repeat across many forms and may help group those forms by location).

Returning to FIG. 5A, at 506, ML system 140 may perform ML training. For example, ML system 140 may use one or more supervised ML algorithms to classify users based on the information filled into filled-in fields and/or may classify fields as requiring data and that therefore should be filled in. ML system 140 may input cleaned data from 504 into an ML algorithm such as neural network, random forest, k-nearest neighbor, or another classification algorithm. The ML algorithm may classify the fields from the input data as belonging to a particular one or more data submission types. In the training phase, if a field is always, or nearly always, filled in within a given form adhering to a given local rule or preference as indicated by the data input into the filled-in fields, that field may be classified as a required field. For example, assume that based on a model of 100 input training data sets marked as "INDIVIDUAL" returns filed by a "MEDIUM" size firm, 90 data sets mark "ZIP" as a required field (e.g., marked manually by accountant users or automatically by previous uses of required field UI 300). The applied ML algorithm may recognize with 90% confidence that the "ZIP" field for "INDIVIDUAL" in "MEDIUM" firm is mandatory. Other fields may be classified as not required. Required fields may be compared against input data from client 120 to identify required fields 306 at runtime, as described below in process 550. ML system 140 may store the results of process 500 (e.g., the field classifications) in training database 145.

Once training data has been developed and stored in training database 145 by process 500, ML system 140 may be able to use the training data to evaluate client 120 data as shown in process 550 of FIG. 5B.

At 552, ML system 140 may obtain data for evaluation. For example, as described above, ML system 140 may receive a data submission originating from client 120 in the context of process 400 (e.g., when called by missing data rule engine 130 at 402).

At 554, ML system 140 may clean the data. For example, ML system 140 may clean data from client 120 to be formatted similarly to the cleaned data used for the ML training process 500, using the same processing that was used to clean the data for the ML training process.

At 556, ML system 140 may perform required field evaluation. In some embodiments, ML system 140 may apply the one or more supervised ML algorithms used to generate the model (e.g., at 508) to the cleaned data from 554 to classify the cleaned data. For example, ML system 140 may relate the cleaned data from 554 with a particular data classification (e.g., indicated by one or more attributes such as a type of return (e.g., individual or joint), a firm type (e.g., small, medium, large), or any other attributes). The ML algorithm may perform ML classification on the cleaned data to classify the fields from the input data. The classification may use filled-in data within the cleaned data from 554 to classify the data submission as being of a particular one or more data submission types within the training data, and then, once classified, may determine whether any blank fields are required based on what data was required data in the training data. For example, assume that based on a model of 100 input data sets marked as "INDIVIDUAL" returns filed by a "MEDIUM" size firm, 90 data sets mark "ZIP" as a required field. If a ML algorithm is applied here, it may recognize with 90% confidence that the "ZIP" field for "INDIVIDUAL" in "MEDIUM" firm is mandatory. Accordingly, a data set received at this step for an "INDIVIDUAL" in "MEDIUM" firm with "ZIP" missing may have "ZIP" classified as a required field. If any fields so classified as required fields are not filled in within the cleaned data from 554, ML system 140 may mark these fields as required fields 306.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of automatically determining at least one required field in a user interface (UI), comprising:
    receiving, at a processor, a data submission made through the UI, the data submission including a plurality of fields used to complete a document, wherein the data submission lacks data in at least one blank field provided in the UI for entering information in which no information has been entered;
    classifying, by the processor, the data submission as having at least one data submission type using at least one machine learning (ML) process that evaluates the data submission against training data including a plurality of sample data submissions having one or more filled in fields that include similar information to data input into at least one field of the data submission;
    determining, by the processor, at least one required field for the at least one data submission type based on patterns, indicated in the training data, of observed fields that are usually filled in for sample data submissions of the at least one data submission type, wherein the at least one required field requiring information to be entered therein;
    determining, by the processor, that the at least one blank field is also the at least one required field; and
    causing, by the processor, the UI to indicate that the at least one blank field is also the at least one required field.

2. The method of claim 1, wherein the classifying further comprises cleaning the data submission before using the at least one ML process.

3. The method of claim 2, wherein the cleaning comprises at least one of:
    discarding a portion of the data submission that is not relevant to the at least one ML process; and
    formatting the data submission to have a same format as training data used by the at least one ML process.

4. The method of claim 1, wherein the at least one ML process uses at least one of a neural network algorithm, a random forest algorithm, and a k-nearest neighbor algorithm.

5. The method of claim 1, wherein the determining of the at least one required field is based at least in part on a local rule applied to the data submission, wherein the local rule does not apply to at least a portion of training data used by the at least one ML process.

6. The method of claim 1, further comprising:
    receiving, by the processor, training data including the plurality of sample data submissions;
    classifying, by the processor, the training data using the at least one ML process; and
    storing, by the processor, a result of the classifying as trained data,
    wherein the classifying of the data submission is based on the trained data.

7. The method of claim 6, further comprising cleaning, by the processor, at least one of the sample data submissions prior to the classifying.

8. The method of claim 7, wherein the cleaning comprises at least one of:
    discarding a portion of the at least one of the sample data submissions that is not relevant to the at least one ML process; and
    collapsing a portion of the at least one of the sample data submissions into a description of the portion and a count of occurrences of the portion within the total sample data submissions.

9. A system configured to automatically determine at least one required field in a user interface (UI), comprising:
    a processor; and
    a non-transitory memory in communication with the processor and configured to store instructions that, when executed by the processor, cause the processor to perform processing comprising:
        receiving a data submission made through the UI, the data submission including a plurality of fields used to complete a document, wherein the data submission lacks data in at least one blank field provided in the UI for entering information in which no information has been entered;
        classifying the data submission as having at least one data submission type using at least one machine learning (ML) process that evaluates the data submission against training data including a plurality of sample data submissions having one or more filled in fields that include similar information to data input into at least one field of the data submission;
        determining at least one required field for the at least one data submission type based on patterns, indicated in the training data, of observed fields that are usually filled in for sample data submissions of the at least one data submission type, wherein the at least one required field requiring information to be entered therein;
        determining that the at least one blank field is also the at least one required field; and
        causing the UI to indicate that the at least one blank field is also the at least one required field.

10. The system of claim 9, wherein the classifying further comprises cleaning the data submission before using the at least one ML process.

11. The system of claim 10, wherein the cleaning comprises at least one of:
discarding a portion of the data submission that is not relevant to the at least one ML process; and
formatting the data submission to have a same format as training data used by the at least one ML process.

12. The system of claim 9, wherein the at least one ML process uses at least one of a neural network algorithm, a random forest algorithm, and a k-nearest neighbor algorithm.

13. The system of claim 9, wherein the determining of the at least one required field is based at least in part on a local rule applied to the data submission, wherein the local rule does not apply to at least a portion of training data used by the at least one ML process.

14. The system of claim 9, wherein the instructions further cause the processor to perform processing comprising:
receiving, by the processor, training data including the plurality of sample data submissions;
classifying, by the processor, the training data using the at least one ML process; and
storing, by the processor, a result of the classifying as trained data,
wherein the classifying of the data submission is based on the trained data.

15. The system of claim 14, wherein the instructions further cause the processor to perform processing comprising cleaning at least one of the sample data submissions prior to the training.

16. The system of claim 15, wherein the cleaning comprises at least one of:
discarding a portion of the at least one of the sample data submissions that is not relevant to the at least one ML process; and
collapsing a portion of the at least one of the sample data submissions into a description of the portion and a count of occurrences of the portion within the total sample data submissions.

17. A method of automatically determining at least one required field in a user interface (UI), comprising:
receiving, at a processor the processor, training data including a plurality of sample data submissions;
classifying, by the processor, the training data using at least one machine learning (ML) process;
storing, by the processor, a result of the classifying as trained data;
receiving, at the processor, a data submission made through the UI, the data submission including a plurality of fields used to complete a document, wherein the data submission lacks data in at least one blank field provided in the UI for entering information in which no information has been entered;
classifying, by the processor, the data submission as having at least one data submission type using the at least one ML process that evaluates the data submission against the trained data, wherein the trained data includes a plurality of sample data submissions having one or more filled in fields that include similar information to data input into at least one field of the data submission;
determining, by the processor, at least one required field for the at least one data submission type based on patterns, indicated in the training data, of observed fields that are usually filled in for sample data submissions of the at least one data submission type, wherein the at least one required field requiring information to be entered therein;
determining, by the processor, that the at least one blank field is also the at least one required field; and
causing, by the processor, the UI to indicate that the at least one blank field is also the at least one required field.

18. The method of claim 17, wherein the at least one ML process uses at least one of a neural network algorithm, a random forest algorithm, and a k-nearest neighbor algorithm.

19. The method of claim 1, wherein the training data includes behavior data generated during one or more user sessions, wherein the behavior data comprises records of filled in fields and not filled in fields for a plurality of sample data submissions previously received by the UI.

20. The system of claim 9, wherein the training data includes behavior data generated during one or more user sessions, wherein the behavior data comprises records of filled in fields and not filled in fields for a plurality of sample data submissions previously received by the UI.

* * * * *